(12) United States Patent
Koleda (10) Patent No.: US 6,702,076 B2
(45) Date of Patent: Mar. 9, 2004

(54) SHAFT VIBRATION DAMPING SYSTEM

(76) Inventor: Michael T. Koleda, 15 Murray Ave., Port Washington, NY (US) 11050

( * ) Notice: Subject to any disclaimer, the term of this patent is extended or adjusted under 35 U.S.C. 154(b) by 0 days.

(21) Appl. No.: 10/037,244

(22) Filed: Jan. 4, 2002

(65) Prior Publication Data

US 2002/0092724 A1 Jul. 18, 2002

Related U.S. Application Data

(60) Provisional application No. 60/261,841, filed on Jan. 16, 2001.

(51) Int. Cl.[7] .................................................. F16F 7/10
(52) U.S. Cl. ....................................................... 188/378
(58) Field of Search ............................. 188/378, 379, 188/380

(56) References Cited

U.S. PATENT DOCUMENTS

| | | | |
|---|---|---|---|
| 2,652,700 A | | 9/1953 | Seibel |
| 3,897,984 A | | 8/1975 | Matheny, Jr. |
| 4,130,185 A | * | 12/1978 | Densmore .................. 188/378 |
| 4,392,681 A | * | 7/1983 | Raquet .......................... 295/7 |
| 4,627,635 A | | 12/1986 | Koleda |
| 4,669,584 A | * | 6/1987 | Santos ........................ 188/134 |
| 4,926,985 A | * | 5/1990 | Mizuno et al. ............. 188/378 |
| 5,135,204 A | * | 8/1992 | Funahashi ................ 267/141.4 |
| 5,593,144 A | * | 1/1997 | Hamada et al. ............. 267/141 |
| 5,613,400 A | * | 3/1997 | Sato et al. .................. 74/89.36 |
| 5,660,256 A | * | 8/1997 | Gallmeyer et al. ......... 188/379 |
| 6,095,922 A | * | 8/2000 | Friedrichsen et al. ......... 464/24 |
| 6,450,487 B1 | * | 9/2002 | Kuwayama ................. 267/141 |

* cited by examiner

*Primary Examiner*—Jack Lavinder
*Assistant Examiner*—Devon Kramer (57) ABSTRACT

Vibration damping systems for use in conjunction with rotating hollow bodies are provided. The vibration damping systems include a tubular outer shaft having a proximal and a distal end and defining a lumen therethrough, a tubular inner shaft having a proximal and a distal end wherein the inner shaft is configured and dimensioned to be received within the lumen of the outer shaft and a plurality of toroidal vibration damping elements disposed between the proximal and the distal ends of the outer and inner shafts. At least one vibration damping element is affixed between the proximal and the distal end of the outer and inner shaft and each end most vibration nodal point of a series of nodal points located along a length of the outer and inner shafts. At least one vibration damping element is affixed between adjacent vibration nodal points of the series of nodal points along the length of the outer and the inner shafts.

20 Claims, 8 Drawing Sheets

SHAFT VIBRATION DAMPING SYSTEM

CROSS REFERENCE TO RELATED APPLICATION

The present application claims priority of U.S. provisional application Ser. No. 60/261,841 filed on Jan. 16, 2001, the entire contents of which are hereby incorporated by reference.

BACKGROUND

1. Technical Field

The present disclosure relates to vibration damping systems and, more particularly to vibration damping systems for elongate rotating shafts.

2. Background of Related Art

A typical arrangement of shafting includes several relatively short segments, a number of grease-lubricated rolling element hanger bearings, and often mechanical couplings to allow for shaft misalignment or to produce an intended curvature in the shaft to conform to various geometric constraints. The reason that conventional shaft segments are relatively short is in order to maintain the overall critical speed of the shaft (i.e., the speed at which resonance occurs, its natural frequency) above the operating speed. Normally there is a trade-off between a relatively short and thick shaft transmitting a large torque or a relatively thin and long shaft transmitting a small torque and rotating at high speed. The present disclosure is concerned with the latter alternative because the distance is relatively large. Therefore, the shaft is rotating at a relatively high speed. Accordingly, to save weight, these drive shafts are generally in the form of hollow tubes. As such, if the operating speed approaches the critical speed of the shaft, without provisions to maintain control of the shaft as the shaft nears and passes through resonance, there is potential for damaging loads and even loss of the shaft and its power-transmitting capacity.

Stated differently, as the rotational velocity of a shaft increases, the shaft passes through several progressively higher speed ranges known as critical speeds. If a shaft is unsupported intermediate of its ends and is rotated at or near what is known as its first order critical speed, centrifugal forces periodically exceed centripetal forces at the shaft's median portion to bow the shaft outwardly from its normal rotational axis, whereupon shaft rotation becomes unstable and excessive vibration occurs. Such excessive vibration may quickly damage bearings and bearing support structures, as well as the shaft itself, and may result in the impact of the shaft against housing elements or in the total destruction of the shaft itself.

A shaft's first order critical speed is inversely related to its length and directly related to its rigidity which, in turn, is directly related to the shaft's diameter. When a shaft is long relative to its diameter, it is more susceptible to whipping caused by an unbalanced mass distribution, which unbalanced mass distribution only aggravate whipping as the rotational speed increases.

Ideally, a shaft would be assembled from a tube that is absolutely round, absolutely straight, and which has uniformly thick walls. Unfortunately, this condition is never found in actual practice. In practice, the cross sections of the tubes may be distorted, the tubes may be bowed and the walls may include regions which are relatively thinner and thicker.

Prior attempts to damp shaft vibration or to otherwise modify shaft vibration modes have had only limited success. For instance, a drive shaft may be equipped with a dynamic damper consisting of a spring and mass system attached to the drive shaft which is tuned to the frequency of the vibration of the drive shaft which is desired to be controlled. The dynamic damper changes the resonance property of the drive shaft so as to suppress the oscillation level at the original resonance frequency of the drive shaft. With the aim of suppressing the resonant vibration of the drive shaft, it has been suggested that the drive shaft may be divided into two segments each of which are separately supported by the vehicle body. By thus reducing the span of the drive shaft (i.e., making the shaft shorter), the resonance frequency of each span is raised, in some cases, well above the frequency of the vibration induced by the rotation of the drive shaft. However, this arrangement of a multiplicity of shorter shafts is not always effective when transmitting rotation over long distances.

In addition, prior approaches addressing the vibrational problems of rotating shafts are described in Matheny, Jr., U.S. Pat. No. 3,897,984, issued Aug. 5, 1975 and Seibel, U.S. Pat. No. 2,652,700, issued Sep. 22, 1953.

Matheny, Jr. provides a shaft support comprising a generally annular resilient member disposed slightly eccentrically about the shaft generally centrally thereof. The resilient member has means associated therewith for exerting a radial preload force on the shaft. The force exerting means includes an annular roller bearing disposed about the shaft and contacting a sleeve thereon. Shaft vibration is thereby damped but at the expense of constant bearing contact and, therefore, constant wear of the shaft and the bearing structure, with consequent power losses due to friction.

In Seibel, a shaft extends through the central aperture of a damper plate which is mounted to the shaft housing by springs. The plate is contacted by a sleeve on the shaft during rotation thereof to absorb energy to prevent transmittal of shock to the supported structure. Structures such as in Seibel tend to be noisy, involve relatively many parts and suffer excessive wear.

Accordingly, a continuing need exists for an improved vibration damping system for use with rotating shafts which overcomes the above noted disadvantages of prior art damping systems.

SUMMARY

Vibration damping systems for use in conjunction with rotating hollow bodies are provided. In one embodiment of the disclosure, the vibration damping system includes a tubular outer shaft having a proximal and a distal end and defining a lumen therethrough, a tubular inner shaft having a proximal and a distal end wherein the inner shaft is configured and dimensioned to be received within the lumen of the outer shaft and a plurality of toroidal vibration damping elements disposed between the proximal and the distal ends of the outer and inner shafts. Preferably, at least one vibration damping element is affixed between the proximal and the distal end of the outer and inner shaft and each end most vibration nodal point of a series of nodal points located along a length of the outer and inner shafts. In addition, preferably, at least one vibration damping element is affixed between adjacent vibration nodal points of the series of nodal points along the length of the outer and the inner shafts.

Moreover, the vibration damping elements of the vibration damping system further include an outer perimetral surface configured and dimensioned to contact an inner surface of the tubular outer shaft and an inner lumen configured and dimensioned to receive the inner tube therethrough. Preferably, each vibration damping element is affixed to the outer tube at approximately 90° intervals, however, it is contemplated that each of the vibration damping elements can be affixed to an inner surface of the outer tube along the entire periphery thereof as well as being affixed to the outer surface of the inner tube along an entire periphery thereof.

In an alternative embodiment, each vibration damping elements of the vibration damping system includes a collar defining a longitudinal opening therethrough and an orthogonally oriented disk extending radially outward from the collar. The collar is configured and dimensioned to receive the inner tube within the opening thereof while the disk is configured and dimensioned to contact an inner surface of the tubular outer shaft. Each vibration damping element being secured in place by the collar being affixed to an outer surface of the inner tube and the edge of the disk being affixed to an inner surface of the outer tube.

In yet another embodiment, the disk includes a proximal rim formed along a periphery of the disk and a distal rim formed along the periphery of the disk. The proximal and distal rims defining a circumferential channel therearound. In this manner, the disk is affixed to the tubular outer shaft by deforming the tubular outer shaft circumferentially along the longitudinal location of the channel of each of the vibration damping elements.

In an alternative embodiment, the vibration damping system includes a tubular outer shaft and at least one vibration damping element internally affixed within the tubular outer shaft. The vibration damping element being affixed at a location between each end of the tubular outer shaft and each end most nodal point of a series of vibration nodal points of said tubular outer shaft. Vibration damping elements also being affixed between each adjacent nodal point of the series of vibration nodal points.

Preferably, the vibration damping element includes a first vibration damping element having an outer surface configured and dimensioned to contact an inner surface of the tubular outer shaft and an inner surface defining a lumen and a second vibration damping element configured and dimensioned to be received within the lumen of the first vibration damping element. The second vibration damping element being affixed to the inner surface of the first vibration damping element at a location between each end of the tubular outer shaft and each end most nodal point of the series of vibration nodal points. In addition, the second vibration damping element is affixed between each adjacent nodal point of the series of vibration nodal points.

In yet another embodiment of the present disclosure, the vibration damping system includes a single cylindrical vibration damping element configured and dimensioned to be received within the tubular outer shaft.

It is an object of the present disclosure to provide a vibration damping system for rotating hollow bodies which overcomes the drawbacks of prior art vibration damping systems.

It is a further object of the present disclosure to provide a vibration damping system for rotating hollow bodies which is effective in increasing the effective rigidity of a rotating object against vibration and which controls undesired vibrations of the rotating hollow body.

It is still a further object of the present disclosure to provide a vibration damping system for rotating bodies which would not substantially increase the mass of the rotating body.

These objects and advantages, together with other objects and advantages of the presently disclosed vibration damping system, along with the various features of novelty which characterize the disclosure, are pointed out with particularity in the claims annexed to and forming a part of this disclosure.

BRIEF DESCRIPTION OF THE DRAWINGS

By way of example only, preferred embodiments of the disclosure will be described with reference to the accompanying drawings, in which.

DETAILED DESCRIPTION OF PREFERRED EMBODIMENTS

The above disclosure overcomes the above-noted and other disadvantages of previous vibration damping systems by providing an improved uniquely advantageous vibration damping system. Preferred embodiments of the presently disclosed vibration damping system will now be described in detail with reference to the drawing figures wherein like reference numerals identify similar or identical elements.

Figure 1:
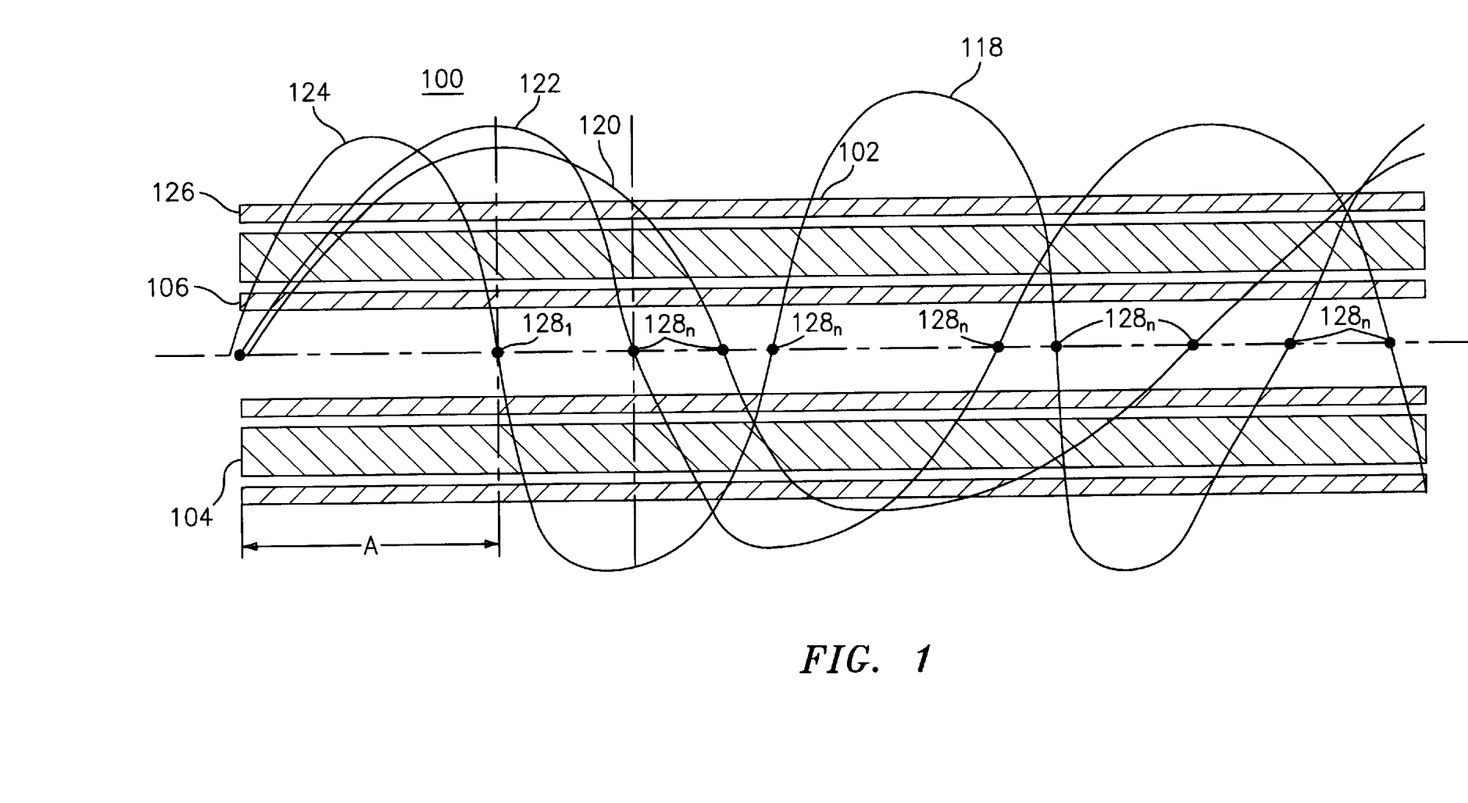
FIG. 1 is a cross-sectional side elevational view of a vibration damping system in accordance with a first embodiment of the present disclosure, taken along a longitudinal axis of a drive shaft.
Figure 2:
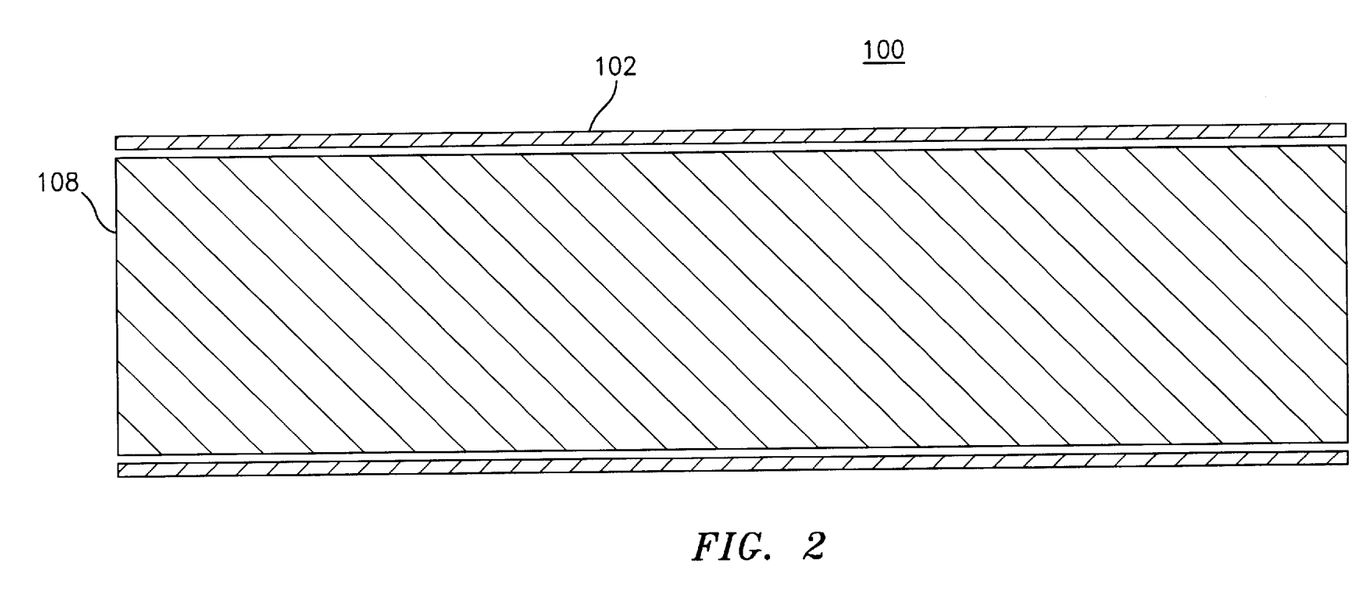
FIG. 2 is a cross-sectional side elevational view of a vibration damping system in accordance with another embodiment of the present disclosure, taken along the longitudinal axis of the drive shaft.
Figure 3:
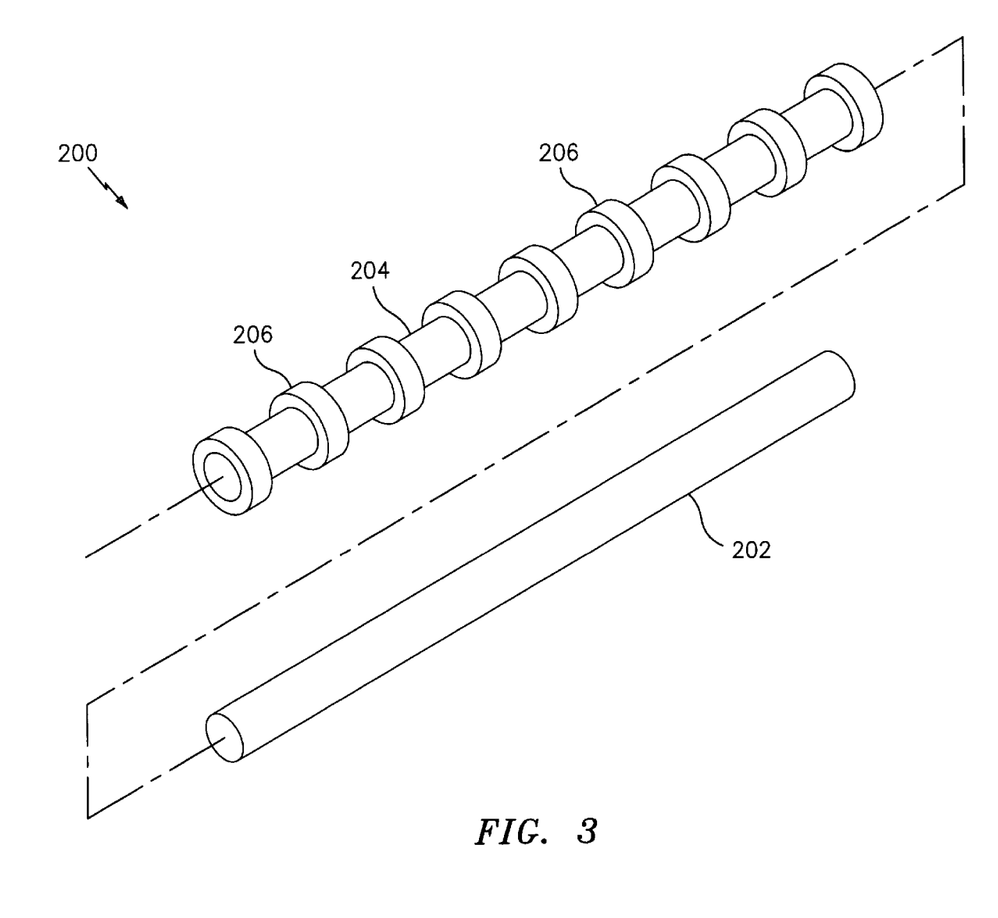
FIG. 3 is an exploded perspective view of a vibration damping system in accordance with yet another embodiment of the present disclosure.

Referring initially to FIGS. 1 and 2, a novel shaft vibration damping system is generally designated as 100. Damping system 100 includes a primary tubular outer shaft 102 into which is inserted at least one vibration damping element 104, 106. One or more of these vibration damping elements 104, 106 is fixed within primary tubular outer shaft 102 at a location dependent on a length of primary tubular outer shaft 102 and on the number of damping elements 104, 106 used. Preferably, damping elements 104, 106 are tubular and extend substantially the entire length of primary tubular outer shaft 102. Vibration damping elements 104, 106 may be secured to fixing point(s) along the length of primary tubular outer shaft 102 by means of bonding, welding or any other known attachment techniques.

Preferably, vibration damping element 104 is tubular, including an outer surface configured and dimensioned to contact the inner surface of outer shaft 102 and defining an inner surface configured and dimensioned to receive vibration damping element 106 therein. Preferably, vibration damping element 106 is also tubular, having an outer surface configured and dimensioned to contact the inner surface of vibration damping element 104 and defining a hollow lumen passing therethrough. While vibration damping element 106 has been disclosed as being tubular (i.e., having a lumen passing therethrough) it is envisioned that vibration damping element 106 can be solid.

In an alternative embodiment, as seen in FIG. 2, a single solid damping element 108 can be fixed within primary tubular outer shaft 102. It is envisioned that depending on the specific application contemplated either hollow damping elements 104, 106, solid damping elements 108 or a combination of the two are used. It is contemplated that damping elements 104, 106 and 108 be fabricated from fiber glass, plastic, graphite, aluminum, steel or other desired material of construction. Similarly, primary tubular outer shaft 102 can be made of known materials such as aluminum, copper, steel, iron, plastic, graphite, fiberglass, composite as well as any combination thereof.

A preferred method of positioning of the fixing point or points of damping elements 104, 106 within primary tubular outer shaft 102 will now be described with reference to FIG. 1. Initially, primary tubular outer shaft 102 is configured to have damping elements 104, 106 placed therein. An accelerometer or a strain gauge (not shown) is then attached to primary tubular outer shaft 102. Primary tubular outer shaft 102 is then placed on a test rig (not shown). In so doing, operating conditions for primary tubular outer shaft 102 are simulated. The test rig, with primary tubular outer shaft 102 in place, is then operated and vibrational measurements of primary tubular outer shaft 102 are taken to identify natural frequencies of vibration 118, 120, 122, 124 for the combination of primary tubular outer shaft 102 and damping elements 104, 106.

Natural frequencies 118, 120, 122, 124 define a series of nodal points $128_n$ (i.e., a point or region of virtually zero amplitude in a periodic system) along the length of primary tubular outer shaft 102. The series of nodal points $128_n$ relate to the various natural frequencies of primary tubular outer shaft 102. With nodal points $128_n$ located, one or more damping elements 104, 106 are then fixed along the inner surface of primary tubular outer shaft 102 at a point in an area, designated by the reference character "A" in FIG. 1, between an end 126 of primary tubular outer shaft 102 and a first nodal point $128_1$ of the series of nodal points $128_n$. Moreover, the damping elements 104, 106 are further fixed between successive adjacent nodal points $128_n$ along the inner surface of primary tubular outer shaft 102.

It is contemplated that, depending on the level of damping desired, a multiplicity of damping elements 104, 106 may be used and fixed at positions within primary tubular outer shaft 102 between nodal points $128_n$ of specific natural frequencies of vibration. If multiple damping elements 104, 106 are used, then each damping element 104, 106 is secured in place. For example, damping element 104 would be secured to the inner surface of primary tubular outer shaft 102 while damping element 106 would be secured to the inner surface of damping element 104. It is contemplated that damping elements 104, 106 are fixed in place with adhesives (i.e., glue, epoxy, etc.), welding (i.e., TIG, MIG, soldering, etc.), press fitting, screwing, or any other know methods for securing a tubular member within another tubular member.

Referring now to FIGS. 3–5B, a vibration damping system in accordance with another embodiment of the present disclosure, for use with a drive shaft, is generally shown as 200. Vibrational damping system of drive shaft 200 includes an outer tube 202, an inner tube 204 and a plurality of vibration damping inserts 206 positioned longitudinally between outer tube 202 and inner tube 204. Both inner and outer tubes may be made of steel, aluminum, titanium, composite, graphite or any combination thereof. Preferably, inserts 206 have a substantially torus configuration, such that inner tube passes through a center of insert 206 while the periphery of insert 206 contact the inner surface of outer tube 202.

Figure 4:
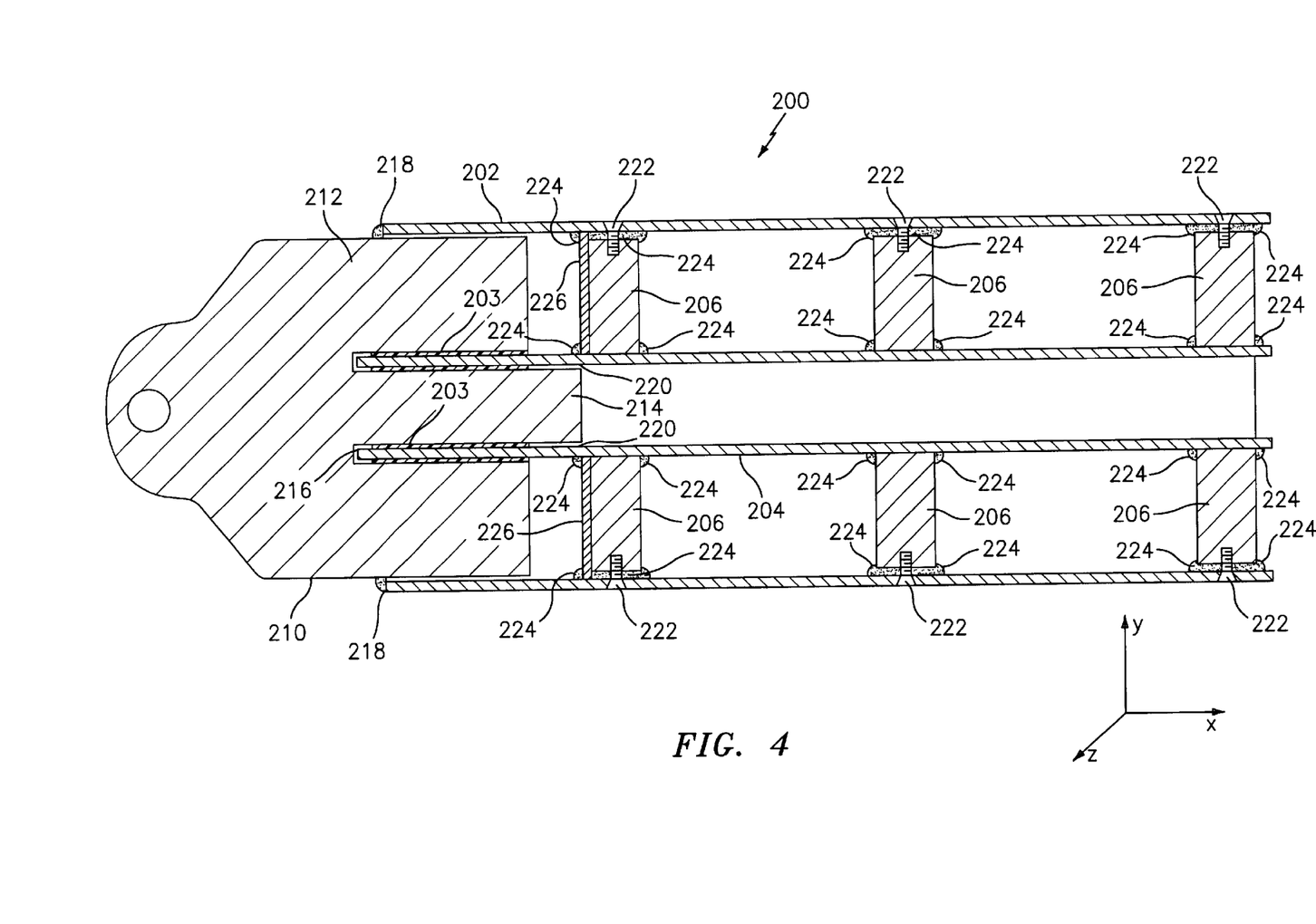
FIG. 4 is a cross-sectional side elevational view of one end of a vibration damping system of FIG. 3.

In FIG. 4, a longitudinal cross-section of an end of drive shaft 200 is shown. As seen in FIG. 4, drive shaft 200 mounts a yoke 210 at one end. Yoke 210 includes an outer annular wall 212 and a central plug 214 therein defining an annular channel 216 therebetween. As seen in FIG. 4, outer annular wall 212 of yoke 210 is configured and dimensioned to receive outer tube 202 while outer wall 212 and central plug 214 are configured and dimensioned so that inner tube 204 is received in annular channel 216. Preferably, yoke 210 is welded to outer tube 202 along a weld line 218. Meanwhile, inner tube 204 is preferably friction welded to yoke 210 and may further include glue or epoxy 203 along any portion of the contacting surfaces in annular channel 216. As seen in FIG. 4, epoxy is preferably positioned along an outer surface 220 of central plug 214 and an inner surface of inner tube 204 in order to enhance bonding as well as vibrational damping.

In accordance with the present disclosure, a plurality of vibration damping inserts 206 are positioned longitudinally along inner tube 204 at distances which preferably do not correspond to the location of nodal points along the length of drive shaft 200 (refer to FIG. 2 above). Vibration damping inserts 206 are preferably made of a substantially inflexible material such as, for example, steel, aluminum, titanium, wood, graphite, epoxy, plastic, etc., although any vibration damping material is contemplated herein. Vibration damping inserts 206 are shown in a substantially torroidal configuration surrounding a portion of the outer periphery of inner tube 204 and contacting a portion of the inner periphery of outer tube 202.

Figure 5A:
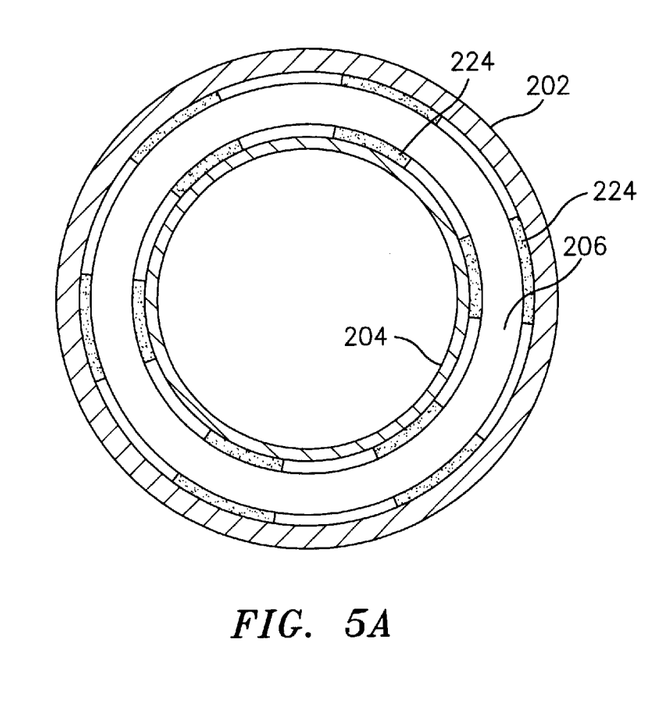
FIG. 5A is an end view of the vibration damping system shown in FIG. 4, in which a vibration damping insert is intermittently bonded to the inner and outer tube, respectively.
Figure 5B:
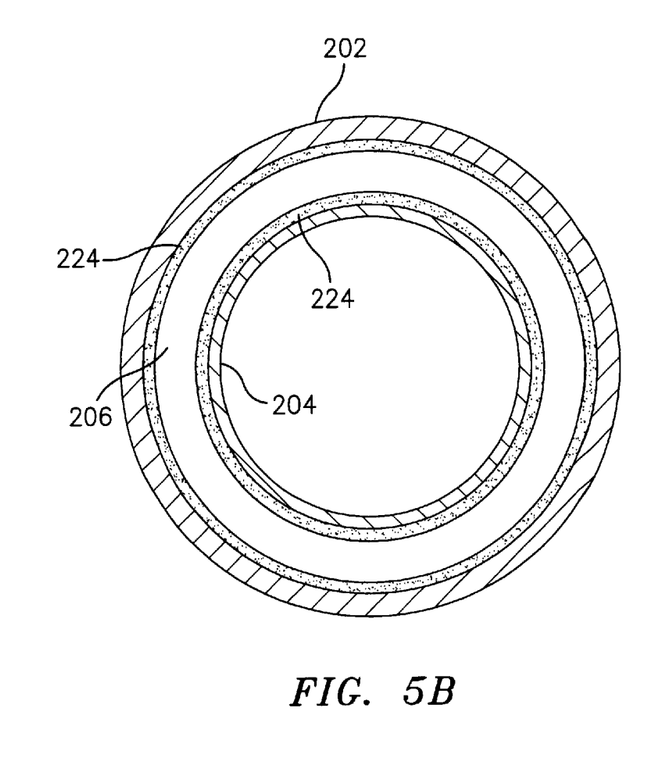
FIG. 5B is an end view of the vibration damping system shown in FIG. 4, in which the vibration damping insert is continuously bonded to the inner and outer tube, respectively.

Preferably, vibration damping inserts 206 are attached to outer tube 202 by means of screws 222 preferably spaced at 90° intervals around outer tube 202. While screws 222 have been disclosed as being spaced at 90° intervals around outer tube 202, it is contemplated that screws 222 can be spaced at any desired angular interval relative to one another. Alternatively, or in addition to screws 222, a bead of epoxy or bonding agent 224 such as 304 Epoxy Adhesive available from Lord Corporation Chemical Products Division, Erie, Pa., 16514, may be used to bond vibration damping inserts 206 to both the outer tube 202 and the inner tube 204. It is contemplated that the bead 222 of epoxy may be intermittently spaced as seen in FIG. 5A or may be formed as a continuous bead as seen in FIG. 5B adjoining the outer and inner surfaces of vibration damping insert 206 with the inner and outer surfaces of tubes 202 and 204, respectively. It is also contemplated that under conditions of high load, the inner and outer tubes as well as the inserts are to be made of steel, aluminum, epoxies or metals, and that the inserts will be welded in place.

In addition to vibrational damping inserts 206, it is also contemplated that a stiffening insert 226 may be positioned longitudinally along inner tube 204, as needed, to provide additional stiffness and vibrational damping. It is contemplated that stiffening inserts 224 may be made of any engineering material, such as, steel, wood, plastic, epoxy, graphite, etc.

Vibration damping inserts 206 are preferably spaced along drive shaft 200 in positions which maximize vibrational damping (i.e., spaced a longitudinal distance from each vibration node) in the longitudinal, lateral and transverse directions along the shaft as indicated by x, y and z, respectively, in FIG. 4. The number and position of vibration damping inserts 206 may vary based on a wide variety of variables including material of construction, contemplated use of drive shaft 200, configuration and dimension of drive shaft 200 as well as mounting methods of drive shaft 200.

Figure 6:
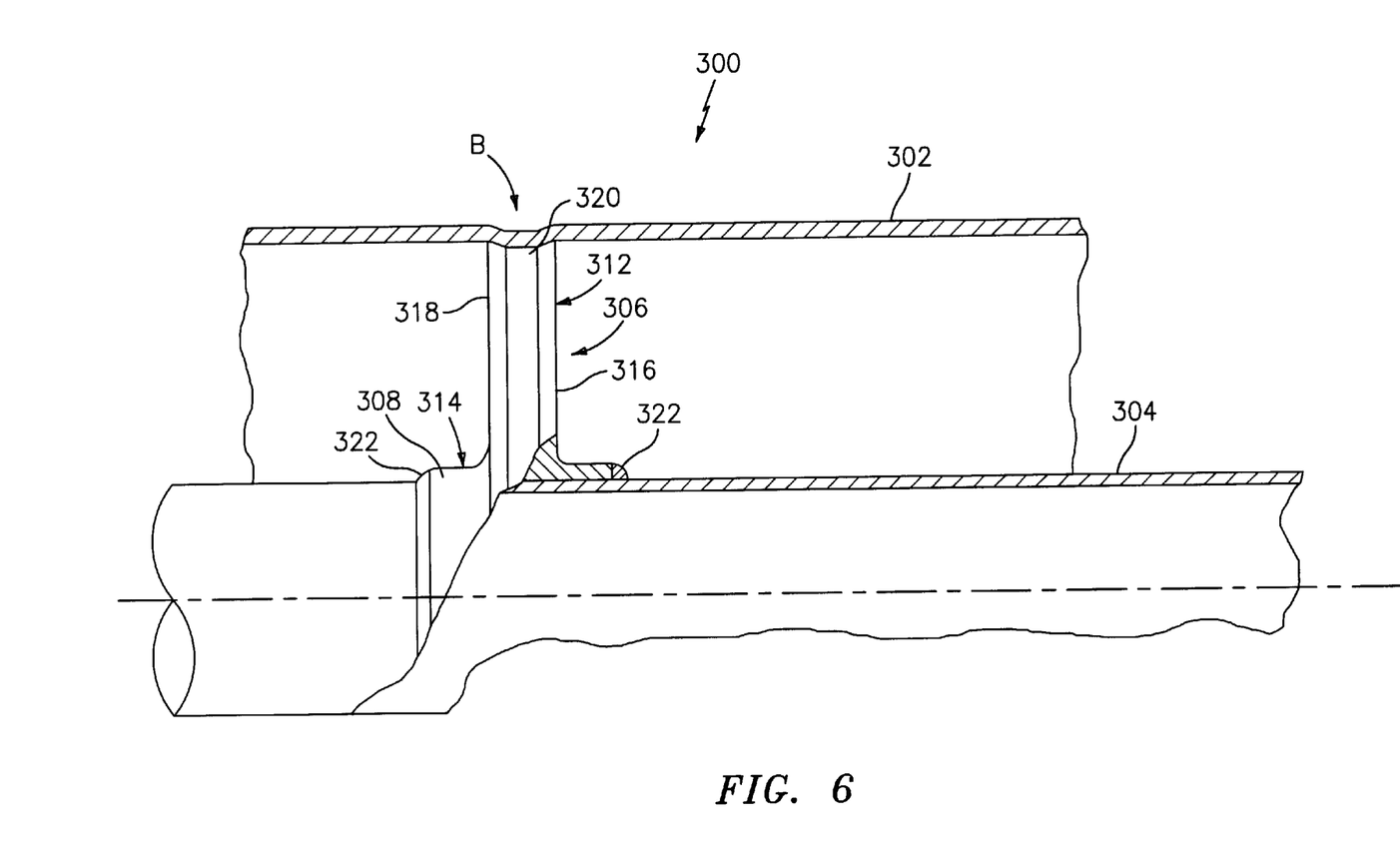
FIG. 6 is a partially exploded cross-sectional side elevational view of a vibration damping system in accordance with another embodiment of the present disclosure.
Figure 7:
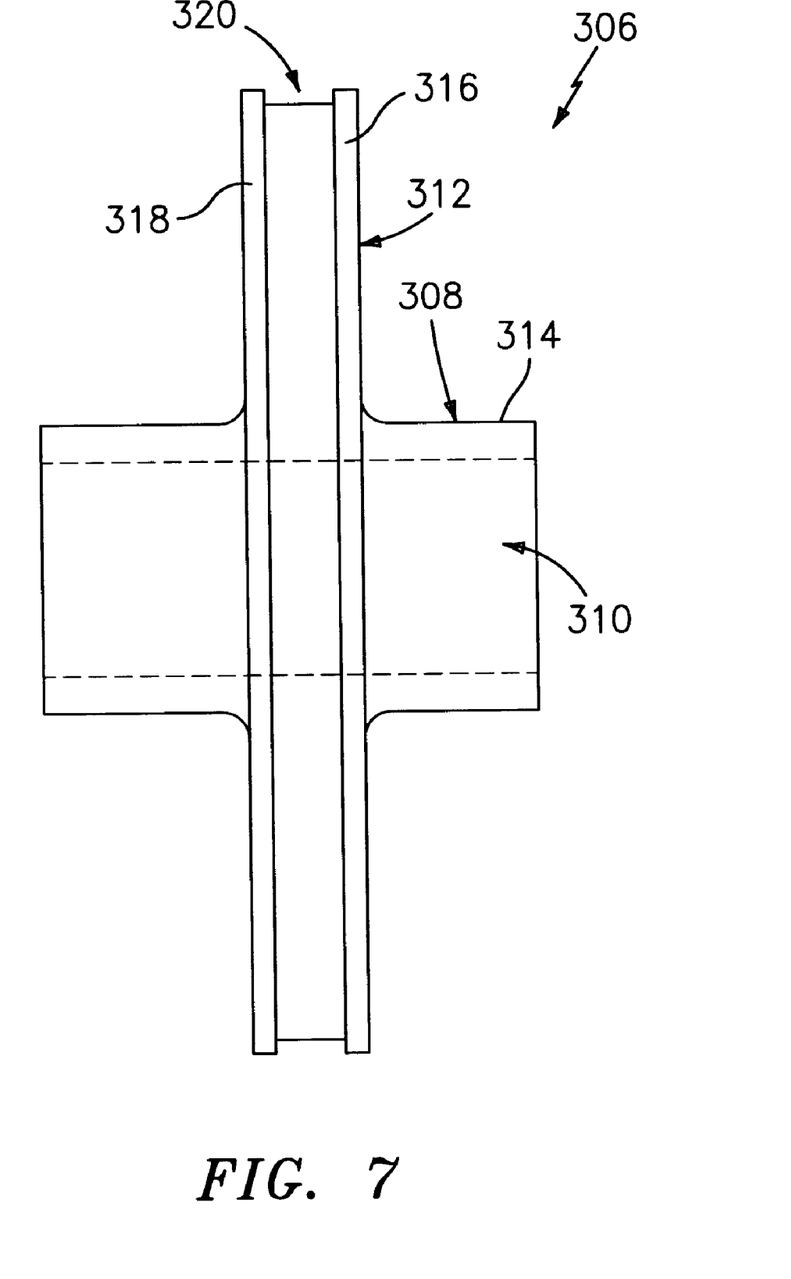
FIG. 7 is a side elevational view of a damper spacer as used in the vibration damping system of FIG. 6.

Referring now to FIGS. 6 and 7, a vibration damping system in accordance with another embodiment of the present disclosure is shown generally as 300. Vibration damping system 300 includes an outer tube 302, an inner tube 304 and a plurality of vibration damping inserts 306 positioned longitudinally along and between inner tube 304 and outer tube 302. Each vibration damping insert 306 includes a central collar 308 defining a longitudinal opening 310 formed therethrough and an orthogonally oriented disk 312 extending radially from an outer surface 314 of collar 308. Disk 312 includes a proximal and a distal rim 316 and 318, respectively, formed along a peripheral edge and extending radially outward therefrom. Rim 316 and 318 defining a circumferential channel 320 therebetween. While vibration damping insert 306 has been disclosed with a solid disk 312, for example, it is envisioned that solid disk 312 can be replaced with a plurality of ribs extending radially from a central collar and a ring affixed to a distal end of each rib.

As envisioned from FIG. 6 a plurality of vibration damping inserts 306 are positioned longitudinally along inner tube 304 at distances, which preferably do not correspond to the locations of vibration nodal points, along the length of vibration damping system 300. Vibration damping inserts 306 are preferably made of a substantially inflexible material such as, for example, steel, aluminum, titanium, wood, graphite, epoxy, plastic, graphite, fiberglass, etc., although any vibration damping material is contemplated herein.

Preferably, as seen in FIG. 6, vibration damping inserts 306 are affixed to the outer surface of inner tube 304 by means of a weld 322 extending completely around collar 308. Alternatively to welding, vibration damping inserts 306 a bead of epoxy or other bonding agent can be used to bond vibration damping inserts 306 to inner tube 304. Concomitantly, vibration damping inserts 306 are affixed to the inner surface of outer tube 302 by means of a pulse weld or crimp at "B". Preferably, the pulse weld circumferentially deforms outer tube 302 into channel 320 of vibration damping insert 306, thereby further preventing movement of vibration damping insert 306 longitudinally along the length of outer and inner tubes 302 and 304. The pulse weld or crimp also serves to place the surface of the outer tube 302 in tension thereby further stiffening and strengthening the overall structure. It is also contemplated that the depth of the crimp or pulse weld can be varied to adjust the amount of tension placed on the outer tube.

Figure 8:
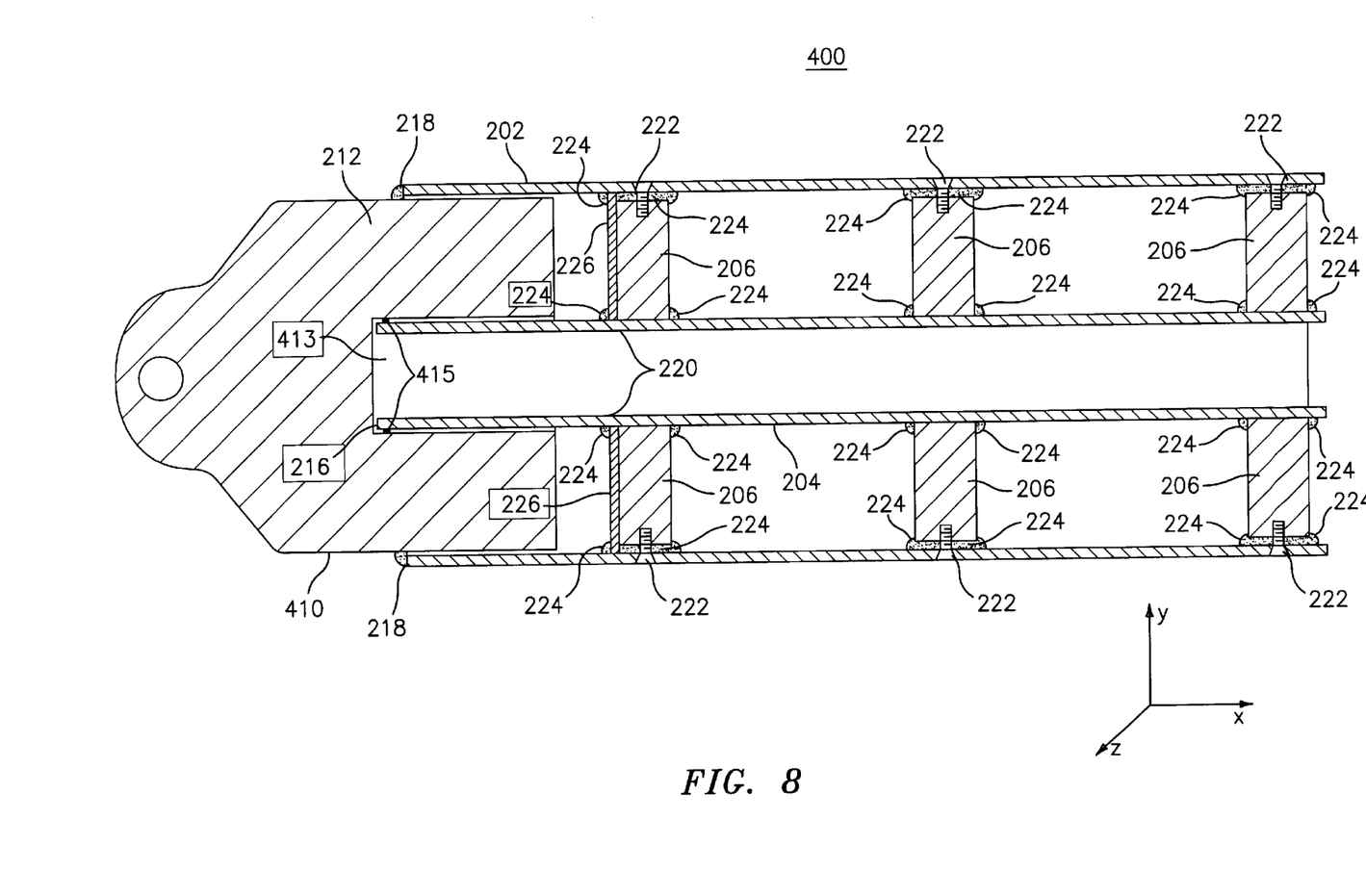
FIG. 8 is a cross-sectional side elevational view of a vibration damping system in accordance with another embodiment.

FIG. 8 illustrates a vibration damping system in accordance with another embodiment of the present disclosure as shown generally at 400. The vibration damping system of FIG. 8 is substantially similar to the system shown in FIG. 4 and operates in a similar manner. The primary distinction is that yoke 410 defines a central coaxial throughbore 413 to receive the end of inner tube 204. In a preferred embodiment throughbore 413 extends through the clevis portion of yoke 410 and provides access to inner tube 204. Inner tube 204 is preferably fixed to yoke 410 by known fixing techniques/materials detailed herein. As shown in FIG. 8, inner tube 204 is welded at a plurality of weld points 415. Alternatively, the weld may be annular and continous.

The foregoing detailed description is illustrative of several embodiments of the invention and it is understood that additional embodiments thereof will be obvious to those skilled in the art. Thus, the above description should not be construed as limiting but merely as exemplifications of preferred embodiments.

What is claimed is:

1. A vibration damping system for use in rotating hollow bodies, comprising:
    a tubular outer shaft having a length and including a plurality of vibration nodal points along the length thereof; and
    a plurality of vibration damping elements internally affixed within said tubular outer shaft and extending axially along the length of the tubular outer shaft, wherein at least one of the plurality of vibration damping elements is affixed to the tubular outer shaft at a location between each end of said tubular outer shaft and each end most nodal point of the plurality of vibration nodal points; and wherein at least another of the plurality of vibration damping elements is affixed between adjacent nodal points of the plurality of vibration nodal points.

2. The vibration damping system according to claim 1, comprising:
    a first elongate tubular vibration damping element disposed within the tubular outer shaft and defining a lumen therethrough; and
    a second elongate vibration damping element disposed within said lumen of said first vibration damping element, wherein each of the first and second vibration damping elements extend substantially the entire length of the tubular outer shaft.

3. The vibration damping system according to claim 2, wherein said second vibration damping element is tubular.

4. The vibration damping system according to claim 2, wherein said second vibration damping element is affixed to said first vibration damping element at a location between each end of said tubular outer shaft and each end most nodal point of the plurality of vibration nodal points and wherein said second vibration damping element is affixed to the first vibration damping element between adjacent nodal points of the plurality of vibration nodal points.

5. The vibration damping system according to claim 1, wherein a single cylindrical vibration damping element is disposed within said tubular outer shaft and extends substantially the length of the tubular outer shaft.

6. The vibration damping system according to claim 1, wherein said vibration damping system further comprises:
    an inner tube disposed within the tubular outer shaft; and
    wherein each vibration damping element is toroidal and includes an outer perimetral surface configured and dimensioned to contact an inner surface of said tubular outer shaft and a central lumen configured and dimensioned to receive said inner tube therethrough.

7. The vibration damping system according to claim 6, wherein each vibration damping element is affixed to at least one of the tubular outer shaft and the inner tube at approximately 90° intervals.

8. The vibration damping system according to claim 6, wherein each of said vibration damping elements is made from at least one of steel, aluminum, titanium, epoxy, fiberglass, graphite and wood.

9. A vibration damping system for use in rotating hollow bodies, comprising:
   a tubular outer shaft;
   at least one vibration damping element internally affixed within said tubular outer shaft, said at least one vibration damping element being affixed at a location between each end of said tubular outer shaft and each end most nodal point of a series of vibration nodal points of said tubular outer shaft; and said at least one vibration damping element being affixed between at least two adjacent nodal points of said series of vibration nodal points; and
   an inner tube, wherein each of said at least one vibration damping element is toroidal and wherein each of said vibration damping elements includes an outer perimetral surface configured and dimensioned to contact an inner surface of said tubular outer shaft and an inner hole configured and dimensioned to receive said inner tube therethrough, wherein each of said vibration damping elements are affixed to an inner surface of said tubular outer shaft along an entire periphery thereof.

10. The vibration damping system according to claim 9, wherein each of said vibration damping elements are affixed to said tubular outer shaft and said inner tube respectively by one of gluing, welding, screws and pins.

11. A vibration damping system for use in rotating hollow bodies, comprising:
   a tubular outer shaft;
   at least one vibration damping element internally affixed within said tubular outer shaft, said at least one vibration damping element being affixed at a location between each end of said tubular outer shaft and each end most nodal point of a series of vibration nodal points of said tubular outer shaft; and said at least one vibration damping element being affixed between at least two adjacent nodal points of said series of vibration nodal points; wherein each of said at least one vibration damping element comprises:
      a collar defining a longitudinal opening therethrough; and
      an orthogonally oriented disk extending radially outward from said collar, wherein said collar is configured and dimensioned to receive said inner tube within said opening, wherein said disk is configured and dimensioned to contact an inner surface of said tubular outer shaft and wherein said collar is affixed to an outer surface of said inner tube and said disk is affixed to an inner surface of said tubular outer shaft; and
   an inner tube, wherein each of said at least one vibration damping element is toroidal and wherein each of said vibration damping elements includes an outer perimetral surface configured and dimensioned to contact an inner surface of said tubular outer shaft and an inner hole configured and dimensioned to receive said inner tube therethrough.

12. The vibration damping system according to claim 11 wherein said disk includes a proximal rim formed along a periphery of said disk and a distal rim formed along said periphery of said disk, said proximal and distal rims defining a circumferential channel therearound.

13. The vibration damping system according to claim 12, wherein said disk is affixed to said tubular outer shaft by deforming said tubular outer shaft circumferentially along the longitudinal location of said channel of each of said vibration damping elements.

14. A vibration damping system for use in rotating hollow, bodies, comprising:
   a tubular outer shaft having a proximal end and a distal end and defining a lumen therethrough, the outer shaft having a length and including a plurality of vibration nodal points along the length thereof;
   a tubular inner shaft disposed within the lumen of the outer shaft, the inner shaft having a proximal end and a distal end and having a length substantially equal to the length of the outer shaft; and
   a plurality of toroidal vibration damping elements disposed between said outer shaft and said inner shaft and extending radially therearound, wherein at least one vibration damping element is affixed between said proximal end and said distal end of said outer shaft and said inner shaft and each end most vibration nodal point, and wherein at least another vibration damping element is affixed between adjacent vibration nodal points of the plurality of nodal points.

15. The vibration damping system according to claim 14, wherein each of said vibration damping elements includes an outer perimetral surface configured and dimensioned to contact an inner surface of said tubular outer shaft and an inner lumen configured and dimensioned to receive said tubular inner shaft therethrough.

16. The vibration damping system according to claim 15, wherein each of said vibration damping elements is affixed to at least one of said tubular outer shaft and said tubular inner shaft at approximately 90° intervals.

17. A vibration damping system for use in rotating hollow bodies, comprising:
   a tubular outer shaft having a proximal and a distal end and defining a lumen therethrough;
   a tubular inner shaft having a proximal and a distal end, said inner shaft being configured and dimensioned to be received within said lumen of said outer shaft; and
   a plurality of toroidal vibration damping elements disposed between said proximal and said distal end of said outer and said inner shafts, wherein at least one vibration damping element is affixed between said proximal and said distal end of said outer and inner shaft and each end most vibration nodal points of a series of nodal points located along a length of said outer and inner shafts, and wherein at least one vibration damping element is affixed between adjacent vibration nodal points of said series of nodal points along said length of said outer and said inner shafts, wherein each of said vibration damping elements is affixed to an inner surface of said tubular outer shaft along an entire periphery thereof and wherein each of said vibration damping elements is affixed to an outer surface of said inner tube along an entire periphery thereof.

18. A vibration damping system for use in rotating hollow bodies, comprising:
   a tubular outer shaft having a proximal and a distal end and defining a lumen therethrough;
   a tubular inner shaft having a proximal and a distal end, said inner shaft being configured and dimensioned to be received within said lumen of said outer shaft; and
   a plurality of toroidal vibration damping elements disposed between said outer and said inner shafts, wherein at least one vibration damping element is affixed between said proximal and said distal end of said outer and inner shaft and each end most vibration nodal points of a series of nodal points located along a length of said outer and inner shafts, and wherein at least one vibration damping element is affixed between adjacent vibration nodal points of said series of nodal points along said length of said outer and said inner shafts, wherein each of said vibration damping elements comprises:

a collar defining a longitudinal opening therethrough; and an orthogonally oriented disk extending radially outward from said collar, wherein said collar is configured and dimensioned to receive said tubular inner shaft within said opening, wherein said disk is configured and dimensioned to contact an inner surface of said tubular outer shaft and wherein said collar is affixed to an outer surface of said tubular inner shaft and said disk is affixed to an inner surface of said tubular outer shaft.

19. The vibration damping system according to claim 18 wherein said disk includes a proximal rim formed along a periphery of said disk and a distal rim formed along said periphery of said disk, said proximal and distal rims defining a circumferential channel therearound.

20. The vibration damping system according to claim 19, wherein said disk is affixed to said tubular outer shaft by deforming said tubular outer shaft circumferentially along the longitudinal location of said channel of each of said vibration damping elements.

* * * * *